United States Patent [19]

Takahashi et al.

[11] Patent Number: 4,883,108
[45] Date of Patent: Nov. 28, 1989

[54] HEAVY-DUTY PNEUMATIC RADIAL TIRE

[75] Inventors: Ken Takahashi, Atsugi; Kazuyuki Kabe, Tokyo, both of Japan

[73] Assignee: The Yokohama Rubber Co., Ltd., Tokyo, Japan

[21] Appl. No.: 248,528

[22] Filed: Sep. 23, 1988

[30] Foreign Application Priority Data

Sep. 24, 1987 [JP] Japan .................. 62-237086

[51] Int. Cl.[4] ................... B60C 9/20; B60C 9/28
[52] U.S. Cl. .................... 152/531; 152/534; 152/538
[58] Field of Search ........... 152/526, 531, 535, 536, 152/538, 527, 534

[56] References Cited

U.S. PATENT DOCUMENTS

| 3,335,777 | 8/1967 | Hutch ........................... 152/535 |
| 3,677,319 | 7/1972 | Mirtain ......................... 152/531 X |
| 4,669,520 | 6/1987 | Koseki et al. ................. 152/535 X |
| 4,696,335 | 9/1987 | Tsukagoshi et al. ........... 152/538 X |

FOREIGN PATENT DOCUMENTS 61-16107  1/1986  Japan ...................... 152/526

Primary Examiner—Raymond Hoch
Attorney, Agent, or Firm—Armstrong, Nikaido, Marmelstein, Kubovcik & Murray

[57] ABSTRACT

A heavy-duty radial tire having a belt layer comprising at least four metallic cord layers of first, second, third, and fourth belts in that order from the carcass layer towards the tread. The first belt has a cord angle of 40° to 75° relative to the circumferential direction of the tire and is split into left and right portions provided on left and right shoulder portions, respectively, so as to provide a space in the central region of a crown portion provided with either at least one organic fiber cord layer having a total tensile strength per unit width of at least 240 kgf/cm and a cord angle of 0° to 10° or an inextensible fiber cord layer having a two-layer structure wherein the sum of the tensile moduli per unit width in the initial tension of all the cords is at least $1.3 \times 10^3$ kgf/cm, the cord angle is larger than 0° and two layers in the two-layer structure cross each other at an absolute angle smaller than the cord angle of the second and third belts. The second belt comprises cords provided at a cord angle of 22° to 30°. The third belt comprises cords crossing the cords constituting the second belt and provided at a cord angle of 10° to 16°. The fourth belt comprises cords provided at a cord angle of at least 18°.

10 Claims, 4 Drawing Sheets

FIG. 5
FIG. 6
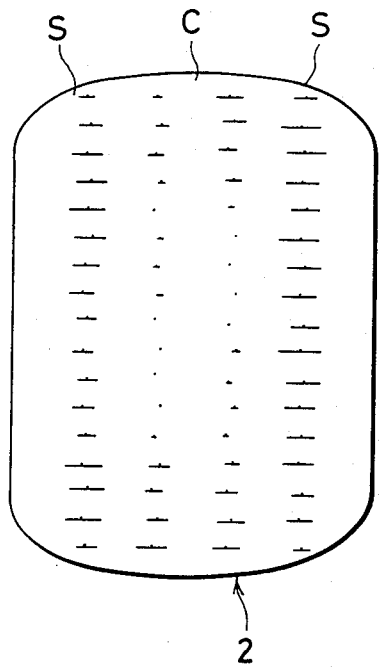
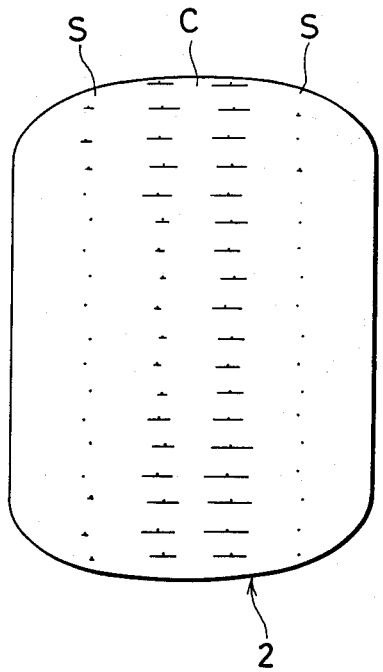

HEAVY-DUTY PNEUMATIC RADIAL TIRE

BACKGROUND OF THE INVENTION

The present invention relates to a heavy-duty pneumatic radial tire wherein the first belt adjacent to a carcass layer has a split structure. More particularly, the present invention is concerned with a heavy-duty pneumatic radial tire wherein a drawback of a split structure, i.e., the problem of an uneven wear occurring at the central portion of a tread has been eliminated while maintaining excellent off road durability derived from the split structure of the first belt.

In general, heavy-duty pneumatic radial tires for trucks, buses, etc. have a belt structure comprising three belts each mad of metallic cords provided between a tread and a carcass layer. In this belt structure, the first belt adjacent to the carcass layer has a cord angle of about 40° to 75° relative to the circumferential direction of the tire and serves as a belt-reinforcing layer, while the second and third belts each have a cord angle of about 10° to 30° relative to the circumferential direction of the tire and cross each other to serve as a tension-resistant layer.

In the above-described belt structure, the first belt is disposed on substantially the whole part of the crown portion to reinforce the tire so as to cope with the pneumatic pressure, thereby ensuring the dimensional stability of the tire. Further, the above-described belt structure contributes to an enhancement of the cross-sectional flexural rigidity in the radial direction of the tire (i.e., the widthwise direction of the tire) over the whole ground-contacting area of the tread, which brings about an excellent effect of improving the uneven wear resistance and driving stability. However, this belt structure cannot follow the movement of the tread surface in response to unevennesses of the ground such as stones and projections, so that there occurs the concentration of stress in response to these unevennesses. This disadvantageously causes not only the tread at the central portion of the crown to be damaged but also the cords of the belt layer within the tire to be broken.

In order to eliminate the above-described disadvantages, a proposal was made on the so-called "split structure" formed by splitting the above-described first belt into two portions and disposing the two split portions respectively on both shoulder portions to form a space in the central region of the crown portion. In this proposal, the split structure was formed in the first belt to lower the cross-sectional flexural rigidity of the central region of the crown portion in the radial direction of the tire to thereby relax the stress.

Although a tire having the above-described split structure exhibited the above-described effect when travelled on a rough road having unevennesses, it brought about another problem when travelled at a high speed on ordinary pavement. Specifically, since the belt-reinforcing action in the central region of the crown portion was weakened, an increase in the growth of the central region of the crown towards the circumferential direction thereof was induced by inflation force of the internal pressure, which rendered the configuration of the crown portion unstable. This brought about a gradual increase in the strain occurring between the tension-resistant layers, i.e., the second and third belts, and finally the occurrence of the separation at the end portions of the belts. Further, this unfavorably brought about a lowering in the driving stability under heavy load conditions.

Accordingly, the present inventors have made extensive and intensive studies with a view to eliminating the above-described problems and, as a result, have found that the belt durability under high-speed travelling conditions can be ensured by disposing an organic fiber cord layer provided at a cord angle of 0° to 10° relative to the circumferential direction of the tire in the space portion of the above-described split structure in the first belt, or disposing two inextensible fiber cord layers each having a specific tensile modulus and crossing each other at a specific angle on the above-described space portion.

However, radial tires having the above-described belt structure brings about a problem of the so-called "uneven wear of center tread" severer than that in the case of the conventional tire provided with a first belt having no split structure, i.e., causes the tread wear rate in the central region of the crown portion to be higher than that in both shoulder regions. In particular, this uneven or irregular wear tends to occur when the tire is mounted on a driving axle. This brought about a problem that the tire should be replaced without accomplishing the intrinsic service life (travel distance) of the tire.

SUMMARY OF THE INVENTION

An object of the present invention is to provide a heavy-duty radial tire which can exhibit excellent durability when travelled not only off road but also at a high speed on ordinary pavement.

Another object of the present invention is to provide a heavy-duty pneumatic radial tire wherein a drawback of a split structure, i.e., an uneven or irregular wear of center tread has been eliminated while maintaining excellent off-road durability derived from the split structure of the first belt.

In order to attain the above-described objects, the radial tire of the present invention comprises a carcass layer, a tread, and a belt layer provided between the carcass layer and the tread, the belt layer comprising at least four metallic cord layers of first, second, third, and fourth belts in that order from the above-described carcass layer towards the above-described tread.

Further, in the above-described belt layer having a multi-layer structure, the first belt is characterized in that it has a cord angle of 40° to 75° relative to the circumferential direction of the tire and is split into left and right portions so as to provide a space in the central region of the crown portion, that the left and right portions are provided on left and right shoulder portions, respectively, and that at least one organic fiber cord layer having a total tensile strength per unit width of 240 kgf/cm or more and a cord angle of 0° to 10° relative to the circumferential direction of the tire is provided on the above-described space. The above-described space may be provided with, instead of the above-described organic fiber cord, an inextensible fiber cord layer having a two-layer structure wherein the sum of the tensile moduli per unit width in the initial tension of all the cords is at least $1.3 \times 10^3$ kgf/cm, the cord angle is larger than 0° and the two layers cross each other at an absolute angle smaller than the minimum cord angle among the cord angles of the above-described second and third belts. Further, the present invention is characterized in that the cords of the above-described second belt are provided at a cord angle of 22° to 30° relative to the circumferential direction of the tire, that the cords of the above-described third belt are provided so as to cross the cords of the above-described second belt and have a cord angle of 10° to 16° relative to the circumferential direction of the tire and that the cords of the above-described fourth belt are provided at a cord angle of at least 18° relative to the circumferential direction of the tire.

BRIEF DESCRIPTION OF THE DRAWINGS

FIG. 5 is an illustrative view showing the amount of the radial component in the movement of the ground-contacting surface of the tread of the conventional tire shown in FIG. 3;

FIG. 6 is an illustrative view showing the amount of the radial component in the movement of the ground-contacting surface of the tread of the conventional tire shown in FIG. 4.

DETAILED DESCRIPTION OF THE PREFERRED EMBODIMENTS

Figure 1:
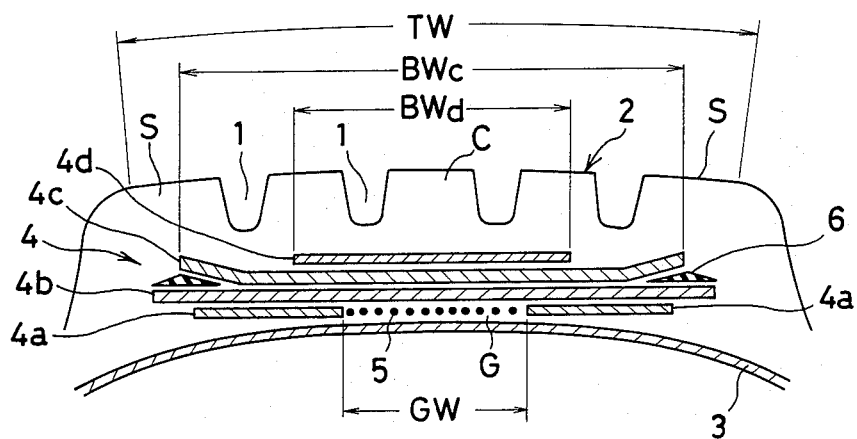
FIG. 1 is a meridian cross-sectional view of an example of a tread portion of a radial tire according to the present invention.
Figure 2:
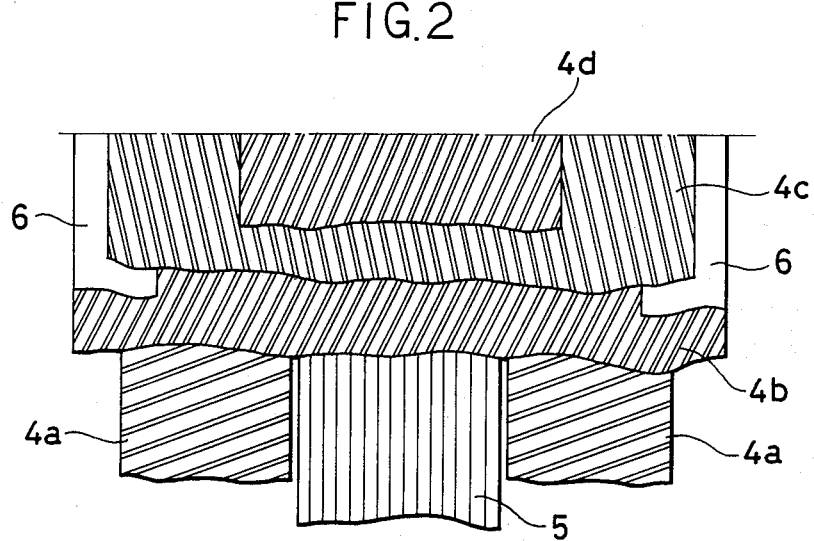
FIG. 2 is a development view of a belt structure of the radial tire shown in FIG. 1.

In FIGS. 1 and 2, numeral 2 is a tread having a plurality of main grooves 1 formed thereon in the circumferential direction of the tire. Numeral 3 is a carcass layer provided on the inside of the tire. The cords of the carcass layer are generally provided radially, i.e., at an angle of 90° relative to the circumferential direction of the tire. However, the carcass layer in which the cords are provided at an angle of 70° to 90°, i.e., in the so-called "semiradial" direction relative to the circumferential direction of the tire also falls within the scope of the present invention. This carcass layer may comprise a single layer or two or more layers.

A belt layer 4 comprises at least four metallic cord layers which are provided between the carcass layer 3 and the above-described tread 2. In this example, the belt layer 4 comprises a first belt $4_a$, a second belt $4_b$, a third belt $4_c$, and a fourth belt $4_d$ in that order from the carcass layer towards the tread. Cushion rubber 6 is interposed between the edge of the second belt $4_b$ and that of the third belt $4_c$.

The first belt $4_a$ has a split structure comprising left and right belt portions. The left and right belt portions are provided on the left and right shoulder portions S and S, respectively, to form a space G in the central region C of the crown portion. In such a split structure, the left and right portions of the first belt $4_a$ each have a cord angle of 40° to 75° relative to the circumferential direction of the tire. When the cord angle is smaller than 40°, an effect of enhancing the flexural rigidity in the radial direction of the tire is small, which brings about remarkable wear of the shoulder portions S. On the other hand, when the cord angle is larger than 75°, the flexural rigidity in the sectional direction of the tire is so high that the rough road durability is lowered.

It is preferred that the width GW of the space G between the left and right portions of the first belt $4_a$ be 25 to 45% of the ground-contact width TW of the tread. When the width GW is less than 25% of the ground-contact width TW of the tread, there occurs no lowering in the cross-sectional flexural rigidity in the radial direction of the tire in the central region of the crown portion, so that it becomes difficult to attain stress relaxation with respect to unevennesses when travelled off road. On the other hand, when the width GW exceeds 45% of the ground-contact width TW of the tread, the effect of the belt $4_a$ for reinforcing the shoulder portions S is lowered, so that a remarkable wear occurs at the shoulder portions S.

On the above-described space G is provided at least one organic fiber cord layer 5 formed by arranging a plurality of organic fiber cords. It is necessary that the organic fiber cord layer 5 have a total tensile strength per unit width of at least 240 kgf/cm and a cord angle of 0° to 10° relative to the circumferential direction of the tire. Alternatively, the space G may be provided with, instead of the above-described organic fiber cord layer, an inextensible fiber cord layer wherein the sum of the tensile moduli in the initial tension of all the cords per unit width is at least $1.3 \times 10^3$ kgf/cm. In the case of the inextensible fiber cord layer, it is necessary that two layers be provided, the cord angle be larger than 0° relative to the circumferential direction of the tire and the two layers cross each other at an absolute angle smaller than the minimum cord angle among the cord angles of the second belt $4_b$ and the third belt $4_c$.

The provision of the first belt $4_a$ in the above-described split form enables a lowering in the cross-sectional flexural rigidity in the radial direction of the tire, which makes it possible to relax the concentration of stress on the tread when the tire runs on a projection such as stone during travelling off road. Further, the provision of the above-described specific organic fiber cord layer 5 or inextensible fiber cord layer on the space G contributes to an improvement in the dimensional stability of the tread and enables the elimination of the drawback of the split structure, i.e., enables the prevention of deformation of the central portion of the crown in the circumferential direction of the tire during travelling on an ordinary road. That is, it is possible to suppress the deformation in the growth of the periphery of the central portion of the crown by inflation force of the internal pressure. This inhibits increase in the strain between the second belt $4_b$ and the third belt $4_c$, so that the lowering in the driving stability under heavy-duty conditions can also be prevented.

In order to attain the above-described effect, it is necessary in the case of the organic fiber cord layer that the cord angle be 0° to 10° relative to the circumferential direction of the tire. On the other hand, in the case of the inextensible fiber cord layer, it is necessary that at least two cord layers each have a cord angle larger than 0° and cross each other at an absolute angle smaller than the minimum angle among the cord angles of the second and third belts. When the cord angle of the inextensible fiber cord layer is 0°, no lift can be applied to a green tire in the step of molding and vulcanization because the cords cannot be stretched, which makes it substantially impossible to manufacture a tire. Therefore, it is necessary that the inextensible fiber cord layers cross each other at an angle larger than 0° and at an absolute angle smaller than the minimum cord angle among the cord angles of the second and third belts. The adoption of such a cord angle enables a lowering in the share of stress attributed to the internal pressure of the second and third belts each serving as a tension-resistant layer.

It is more preferred that the cords of the inextensible fiber cord layers be provided at intervals of 0.6 mm or less and the coating rubber of the inextensible fiber cord layers have a 100% modulus of at least 40 kgf/cm$^2$.

The fiber for use in the organic fiber cord layer of the present invention is preferably selected from among heat-shrinkable nylon fibers and polyester fibers. On the other hand, the fiber for use in the inextensible fiber cord layer is selected from among organic fibers, such as aromatic polyamide fibers, and further inorganic fibers such as carbon fibers, silicon carbide fibers, alumina fibers, and glass fibers, among which aromatic polyamide fibers are most suitable for the inextensible fiber cord layer.

In the present invention, the cord angles of the above-described second belt $4_b$, third belt $4_c$, and fourth belt $4_d$ relative to the circumferential direction of the tire are very important. It is necessary that the cord angles of the second belt $4_b$ and the third belt $4_c$ be 22° to 30° and 10° to 16°, respectively, and the cords of the belt $4_b$ cross the cords of the belt $4_c$.

On the other hand, in the conventional heavy-duty radial tires, the cord angles of the second belt $4_b$ and the third belt $4_c$ are both generally 18° to 20° from the viewpoint of giving importance to the durability, and the cords of the second belt $4_b$ cross the cords of the third belt $4_c$ at the same angles although the directions of inclination are different. However, a combination of such a small cord angle of the second and third belts with a split structure of the first belt $4_a$ brought about a problem that the driving stability was lowered under heavy duty conditions.

In the present invention, as described above, the cords of the second belt $4_b$ are provided at an angle of at least 22° to increase the flexural rigidity in the sectional direction of the tire, thereby linearly changing the cornering power according to the change in the load under heavy duty conditions, which contributes to an improvement in the driving stability. On the other hand, the cords of the third belt $4_c$ are provided at an angle of 16° or smaller which is smaller than the angle of 18° in the conventional radial tire, thereby ensuring the dimensional stability in the circumferential direction of the tread and maintaining the durability so as to control the growth of the periphery of the central portion of the crown.

A further important feature of the present invention resides in that the fourth belt $4_d$ is provided at a cord angle of at least 18°, preferably 20° to 24° relative to the circumferential direction of the tire. This feature enabled the drawback of the split structure, i.e., the irregular wear of center tread, to be eliminated.

The present inventors have experimentally confirmed that the wear rate of the tread is closely related to the amount of the radial component in the movement of the ground-contacting surface of the tread and have found that, therefore, the suppression of the movement of the radial component enables the occurrence of the uneven or irregular wear to be effectively prevented.

Figure 3:
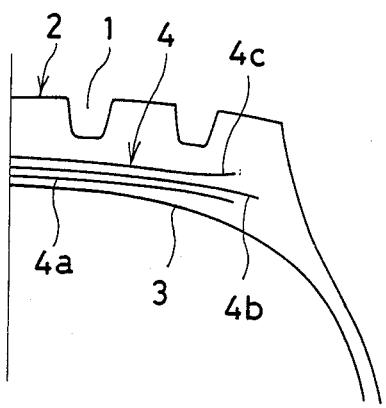
FIGS. 3 and 4 are each a schematic meridian half cross-sectional view of a conventional radial tire.
Figure 4:
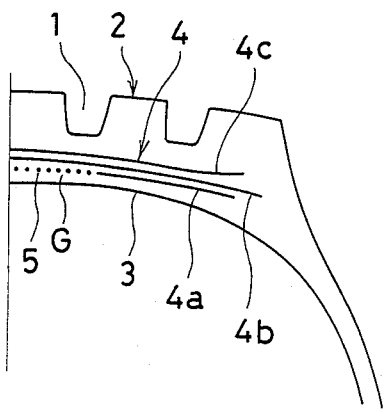

In the case of five-ribbed pattern having four main grooves 1, a radial tire shown in FIG. 3 and having such a belt structure that the first belt $4_a$ has a full width without being split and no fourth belt is provided and a radial tire shown in FIG. 4 and having such a belt structure that the first belt $4_a$ has a split structure and no fourth belt is provided have the radial component distributions in the movement of the tread surface around the main grooves in contact with the ground shown in FIGS. 5 and 6, respectively. Specifically, in the tire shown in FIG. 3 having a first belt of a full width, the movement of the tread surface at both shoulder regions S is larger than that of the tread surface at the central region C of the crown portion. On the other hand, in the tire shown in FIG. 4 having a first belt of a split structure, the movement of the tread surface of both shoulder regions S is very suppressed, while the movement at the central region S of the crown portion is very increased.

That is, the tire having a split structure shown in FIG. 4 is very superior to the tire free from a split structure shown in FIG. 3 in the resistance to the uneven wears, such as dropping out in both shoulder regions and railway wear, but is inferior thereto in the uneven wear of center tread in the case of the tire mounted on a driving axle wherein the wear of the central region of the crown portion proceeds although the above-described types of wears hardly occur.

Further, the study conducted by the present inventors have revealed that the radial component in the movement of the ground-contacting surface of the tread is closely related to the way of providing the belt and the angle of the belt and is influenced mainly by the first belt $4_a$ provided at an angle of 40° to 75° relative to the circumferential direction of the tire and by the second and third belts successively provided on the side of the ground-contacting surface of the tread.

It can be expected from these findings that in the case of the tire having a split structure shown in FIG. 4, an increase in the cord angle relative to the circumferential direction of the tire with respect to the third belt provided on the side of the tread is effective in suppressing the uneven wear of center tread. However, as described above, an increase in the cord angle of the third belt serving as a tension-resistant layer brings about another problem that the belt durability under heavy-duty conditions is lowered.

Accordingly, in the present invention, the fourth belt $4_d$ is additionally provided on a portion corresponding to a space of the newly formed split structure, and the cords of the fourth belt $4_d$ are provided at an angle of at least 18°, preferably at least 20°. The provision of the fourth belt brings about a lowering in the amount of the radial component in the movement of the tread surface at the central region of the crown portion, so that the uneven wear of center tread is suppressed.

The larger the cord angle of the above-described fourth belt relative to the circumferential direction of the tire, the better the effect of suppressing the uneven wear. However, when the cord angle is excessively large, the off road durability derived from the formation of a split structure in the first belt $4_a$ is lowered. For this reason, the upper limit of the cord angle is preferably 24°.

It is preferred that the width $BW_d$ of the fourth belt $4_d$ is larger than the width GW of the space G of the first belt $4_a$. Further, when the width $BW_d$ of the fourth belt $4_d$ approaches the width $BW_c$ of the third belt $4_c$, it becomes difficult to scatter the radial component in the movement of the tread surface from the central region of the crown portion, which brings about a lowering in the effect of improving the uneven or irregular wear resistance. Therefore, it is preferred that the maximum width among the widths $BW_d$ of the fourth belt $4_d$ is 75% or less, preferably 60% or less of the width $BW_c$ of the third belt $4_c$. Further, the cords of the fourth belt $4_d$ may be provided so as to parallel or cross the cords of the third belt $4_c$.

Examples of the present invention will now be described.

EXAMPLE 1

Conventional tire A having a belt structure shown in FIG. 3, conventional tire B having a belt structure shown in FIG. 4, and tire C of the present invention having a belt structure shown in FIGS. 1 and 2 each having a tire size of 10.00R20 and a five-ribbed pattern provided with four main grooves substantially linearly extending in the circumferential direction of the tread surface were manufactured.

Metallic cords having the following dimension and structure 3(0.20 mm)+6(0.38 mm) were used for the belts of all the above-described three types of tires A, B, and C. The end count in each belt was as follows:
 first belt: 4.2 cords/cm
 second belt: 5.6 cords/cm
 third belt: 5.6 cords/cm
 fourth belt: 4.8 cords/cm
It is noted that the fourth belt was provided only for tire C of the present invention.

The width GW of the space G of the first belt in tire B and C and that of the first belt in tire C were both 60 mm. The width (mm) and cord angle (°) relative to the circumferential direction of the tire with respect to the above-described first to fourth belts are shown in Table 1.

TABLE 1

| belt width (mm)/ cord angle (°) | tire A (conventional) | tire B (conventional) | tire C (present invention) |
|---|---|---|---|
| first belt (mm/°) | 170/67 | 55 × 2/67 | 55 × 2/67 |
| second belt (mm/°) | 190/18 | 190/25 | 190/25 |
| third belt (mm/°) | 175/18 | 175/15 | 175/15 |
| fourth belt (mm/°) | — | — | 100/22 |

The following organic fiber cord layer was provided in tires B and C:
 nylon 66 cord: 1890 D/2
 end count: 9.2 cords/cm
 number of layers: single layer
 cord angle: 0°

These three types of tires A, B, and C were tested by the following evaluation methods I and II to determine the wear resistance index based on the maximum wear groove (a groove which had brought about the most advanced wear attributed to an uneven wear) and the amount of the uneven wear based on the residual groove difference (difference in depth between the maximum wear groove and the minimum wear groove). The results are shown in Table 2.

EVALUATION METHOD I

The above-described tires were each mounted on a rim having a size of 7.00T×20 and filled with air at a pressure of 7.2 kgf/cm³, and the load was adjusted to 2400 kg/tire. These tires were each mounted on a driving axle of a truck and travelled until the travel distance reached 50,000 km.

EVALUATION METHOD II

The above-described tires were each mounted on a rim having a size of 7.00T×20 and filled with air at a pressure of 7.2 kgf/cm³, and the load was adjusted to 2550 kg/tire. These tires were each mounted on a steering shaft of a truck and travelled until the travel distance reached 50,000 km.

TABLE 2

| | | tire A | tire B | tire C |
|---|---|---|---|---|
| driving axle | wear resistance index | 100 | 80 | 100 |
| | amount of uneven wear | uneven wear of center tread: 1.5 mm | uneven wear of center tread: 3.2 mm | uneven wear of center tread: 1.7 mm |
| steering axle | wear resistance index | 100 | 110 | 125 |
| | amount of uneven wear | dropping out in shoulder portion: 3.5 mm | uneven wear of center tread: 1.5 mm | uneven wear of center tread: 0.2 mm |

It is apparent from Table 2 that when the tires were each mounted on a driving axle, the uneven wear of center tread of tire C of the present invention was at best comparable to that of tire A provided with a first belt having a full width, while tire B having a split structure underwent an uneven wear of center tread much larger than those of the other tires A and C.

When the tires were mounted on a steering axle, tire A underwent a remarkable dropping out in the shoulder portion, and tire B underwent an uneven wear of center tread, while tire C of the present invention scarcely underwent both dropping out in the shoulder and uneven wear of center tread. Therefore, the tires of the present invention can be expected to have a remarkable improvement in the service life over the other tires A and B.

EXAMPLE 2

There were prepared, besides tires A, B, and C of Example 1, tires D, E, and F each having the same structure as that of tire C, except that the cord angle of the fourth belt $4_d$ was 15° in the case of tire D, 18° in the case of tire E, and 25° in the case of tire F.

With respect to these six types of tires A, B, C, D, E, and F, the movement of the tread surface around the main grooves in the central region of the crown portion was determined. The maximum value of the radial component is shown in FIG. 7.

Figure 7:
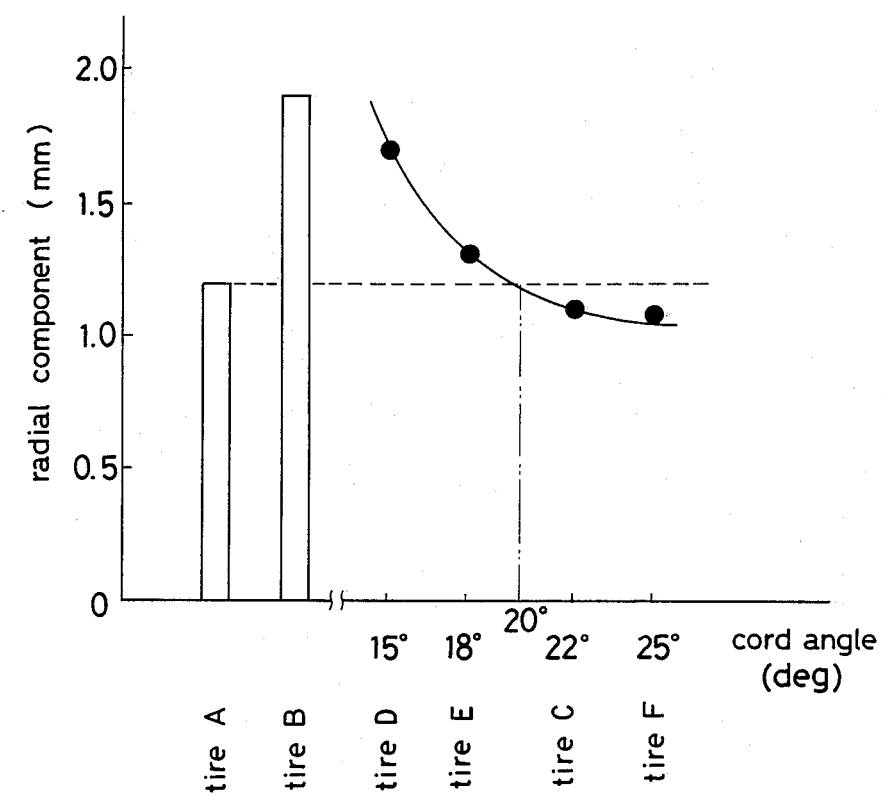
FIG. 7 is a graph showing the relationship between various tires and the amount of the radial component in the movement of the tread surface of the tire.

It is apparent from FIG. 7 that in tire E having a cord angle of 18° in the belt $4_d$, the amount of the radial component in the movement of the tread surface is reduced to the level near that of tire A and, when the cord angle is 20°, the amount of the radial component in the movement of the tread surface can be reduced to substantially the same level as that of tire A. That is, it is apparent that the cord angle of the fourth belt is preferably at least 18°, more preferably 20°.

Further, it is apparent that when the cord angle exceeds 20°, the effect is substantially saturated. When the cord angle is too large, the off-road durability of tread derived from the split structure of the first belt $4_a$ is lowered. Therefore, the upper limit of the cord angle is preferably 25°.

As described above, the present invention enables the suppression of the uneven wear of center tread while maintaining excellent belt durability and driving stability in a radial tire comprising a first belt having a split structure, which makes it possible to remarkably prolong the service life of the tire.

What is claimed is:

1. A heavy-duty radial tire comprising a carcass layer, a tread, and a belt layer provided between said carcass layer and said tread, said belt layer comprising at least four metallic cord layers of first, second, third, and fourth belts in that order from said carcass layer towards said tread, wherein said first belt has a cord angle of 40° to 75° relative to the circumferential direction of the tire and is split into left and right portions so as to provide a space in the central region of a crown portion, said left and right portions being provided on left and right shoulder portions, respectively; said space is provided with at least one organic fiber cord layer having a total tensile strength per unit width of at least 240 kgf/cm and a cord angle of 0° to 10° relative to the circumferential direction of the tire; said second belt comprises cords provided at a cord angle of 22° to 30° relative to the circumferential direction of the tire; said third belt comprises cords crossing said cords constituting said second belt and provided at a cord angle of 10° to 16° relative to the circumferential direction of the tire; and said fourth belt comprises cords provided at a cord angle of at least 18° relative to the circumferential direction of the tire.

2. A heavy-duty radial tire according to claim 1, wherein the width of said space between said left and right portions of said first belt is 25 to 45% of the ground-contacting width of said tread.

3. A heavy-duty radial tire according to claim 1, wherein the cord of said organic fiber cord layer comprises a fiber selected from the group consisting of a nylon fiber and a polyester fiber.

4. A heavy-duty radial tire according to claim 1, wherein the width of said fourth belt is larger than the width of said space between said left and right portions of said first belt and 75% or less of the width of said third belt.

5. A heavy-duty radial tire according to claim 1, wherein the cord angle of said fourth belt is 20° to 24°.

6. A heavy-duty radial tire comprising a carcass layer, a tread, and a belt layer provided between said carcass layer and said tread, said belt layer comprising at least four metallic cord layers of first, second, third, and fourth belts in that order from said carcass layer towards said tread, wherein said first belt has a cord angle of 40° to 75° relative to the circumferential direction of the tire and is split into left and right portions so as to provide a space in the central region of a crown portion, said left and right portions being provided on left and right shoulder portions, respectively; said space is provided with an inextensible fiber cord layer having a two-layer structure wherein the sum of the tensile moduli per unit width in the initial tension of all the cords is at least $1.3 \times 10^3$ kgf/cm, the cord angle is larger than 0° and two layers in said two-layer structure cross each other at an absolute angle smaller than the cord angle of said second and third belts; said second belt comprises cords provided at a cord angle of 22° to 30° relative to the circumferential direction of the tire; said third belt comprises cords crossing said cords constituting said second belt and provided at a cord angle of 10° to 16° relative to the circumferential direction of the tire; and said fourth belt comprises cords provided at a cord angle of at least 18° relative to the circumferential direction of the tire.

7. A heavy-duty radial tire according to claim 6, wherein the width of said space between said left and right portions of said first belt is 25 to 45% of the ground-contacting width of said tread.

8. A heavy-duty radial tire according to claim 6, wherein the cord of said inextensible fiber cord layer comprises a fiber selected from the group consisting of an aromatic polyamide fiber, a carbon fiber, a silicon carbide fiber, an alumina fiber, and a glass fiber.

9. A heavy-duty radial tire according to claim 6, wherein the width of said fourth belt is larger than the width of said space between said left and right portions of said first belt and 75% or less of the width of said third belt.

10. A heavy-duty radial tire according to claim 6, wherein the cord angle of said fourth belt is 20° to 24°.

* * * * *